No. 719,817. PATENTED FEB. 3, 1903.
R. F. KUNZE.
HOSE OR PIPE MENDER.
APPLICATION FILED MAY 16, 1902.
NO MODEL.
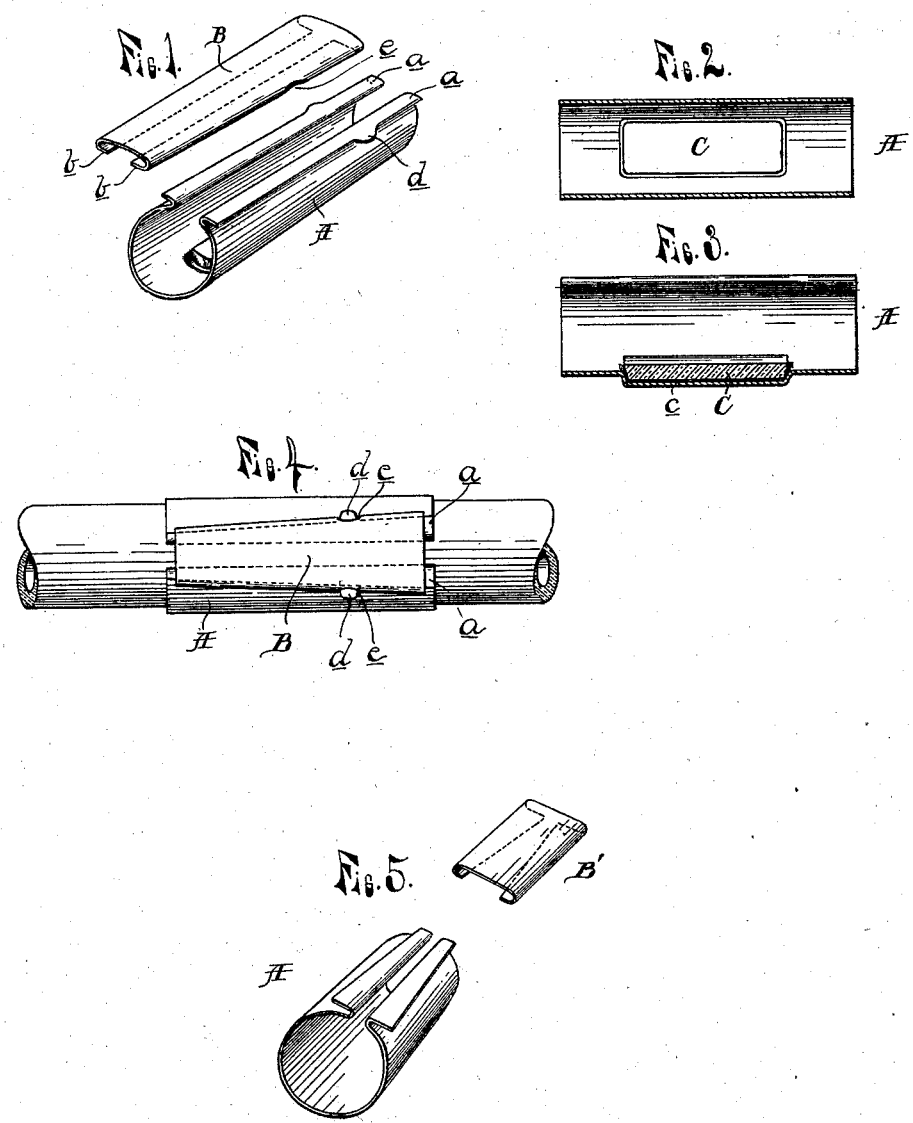

UNITED STATES PATENT OFFICE.

REINHART F. KUNZE, OF DETROIT, MICHIGAN, ASSIGNOR TO THE KUNZE CLAMP AND HOSE MENDER COMPANY, OF DETROIT, MICHIGAN, A PARTNERSHIP.

HOSE OR PIPE MENDER.

SPECIFICATION forming part of Letters Patent No. 719,817, dated February 3, 1903.

Application filed May 16, 1902. Serial No. 107,599. (No model.)

*To all whom it may concern:*

Be it known that I, REINHART F. KUNZE, a citizen of the United States of America, residing at Detroit, in the county of Wayne and State of Michigan, have invented certain new and useful Improvements in Hose or Pipe Menders, of which the following is a specification, reference being had therein to the accompanying drawings.
This invention is designed for mending leaky hose or pipe, and is especially applicable for hose or pipe in which compressed air is conveyed to pneumatic tools—as, for instance, pneumatic riveters, where injury to the hose is of frequent occurrence as a result of dropping hot rivets on the hose; and it is the object of my invention to provide a simple, cheap, and effective device complete in itself which can be readily applied by the workman himself without the use of special tools or other appliances to close a leak in the hose or pipe.

To this end my invention consists of a tubular clip adapted to partially encircle the hose or pipe and provided with a clasp arranged to clamp the open ends of the clip together and of a pad held within the clip and adapted to seal the break in the hose or pipe, all arranged and operating as more fully hereinafter described, and shown in the accompanying drawings, in which—

Figure 1 is a perspective view of my improved device, the parts being detached. Fig. 2 is a horizontal longitudinal section through the clip. Fig. 3 is a vertical longitudinal section through the clip at right angles to Fig. 2. Fig. 4 shows a section of hose or pipe to which my device is applied. Fig. 5 is a perspective view of a modified construction detached.

A represents a tubular clip made of tin or other thin sheet metal and provided along the longitudinal edges with outwardly-bent portions forming hooks *a*.
B represents the clasp, made of tin or other thin sheet metal and provided along its longitudinal edges with inwardly-bent flanges forming hooks *b*, so arranged that the clasp is adapted to secure the open ends of the clip together when the hooks of one are engaged with the hooks of the other, the two parts when united forming a complete tube, the inner diameter of which should be about equal or slightly less than the exterior diameter of the hose or pipe to be mended.

The clip is provided with a recess *c*, adapted to form a seat for a pad C, which may be of rubber for mending hose or of lead for mending pipe. This pad in case of being rubber or other like material may be glued or otherwise fastened in this recess to prevent it from falling out, or in case of its being lead or other like material it may be for a like purpose soldered in or otherwise fastened. This pad projects into the interior space of the clip and forms the sealing medium for closing the leak in the hose or pipe by applying the clip over the defective portion of the pipe or hose by springing the edges apart and then hooking the ends of the clip together by means of the clasp.

In order to press the pad firmly against the leak in the hose or pipe, the hooked edges of the clip or pad, or preferably of both, are made to slightly converge toward each other either the whole length or for a portion of their length in such manner that the open ends of the clip are forcibly drawn together by driving home the clasp, and thereby pressing the pad firmly against the leak. I also find it desirable, especially in case of menders for iron pipe, to lock the clasp in position against accidental displacement. To this end I preferably form the hooked flanges *a* of the clip, one or both, with locking projections *d*, and correspondingly therewith form the hook-flanges of the clasp with locking-recesses formed by filing or cutting away a corresponding portion *e* at the outer edge.

While I have described my invention as a hose or pipe mender, it is obvious that it may be applied to other uses, such as for clamping hose to coupling members, &c.

My device has been found in practice to answer well for the purpose for which it has been designed and forms a useful article of manufacture which has done away with many of the inconveniences connected with the use of pneumatic tools, where injury to the hose is difficult to avoid.

It is obvious that my device may be used as well for a hose-clamp as a mender, and in Fig. 5 I have shown a modified construction with the sealing-pad omitted, the opposite edges of the sliding member B' being parallel, while the bent lips or hooks on both the clip and clasp are tapered to exert the necessary wedge action to securely clamp the parts together.

What I claim as my invention is—

1. As a new article of manufacture, a hose or pipe mender composed of a tubularly-formed sheet-metal clip adapted to partly encircle the pipe or hose and have an opening between its longitudinal edges for introducing the hose or pipe by springing the edges apart, said edges being formed with hook-flanges, a sealing-pad secured in a recess in said clip between the open ends and projecting into the interior space in the clip, and a locking-clasp having hook-flanges adapted to engage with and draw the edges of the clip together, and locking projections on the edges of the clip adapted to engage into recesses formed in the edges of the clasp.

2. As a new article of manufacture, a hose or pipe mender composed of a split sleeve adapted to be clamped around the hose, of a sealing-pad secured in said sleeve and projecting into the interior space of said sleeve.

3. As a new article of manufacture, a pipe-mender composed of a tubular member adapted to be clamped around the pipe, of a sealing-pad of soft metal secured in a recess in said member and projecting into the interior space of said member and conforming to the shape thereof.

In testimony whereof I affix my signature in presence of two witnesses.

REINHART F. KUNZE.

Witnesses:
  OTTO F. BARTHEL,
  THOMAS G. LONGSTAFF.